United States Patent [19]

Hummel

[11] 3,993,204

[45] Nov. 23, 1976

[54] METHOD AND MEANS FOR CONVEYING ITEMS

[76] Inventor: Francis F. Hummel, 1612 4th Ave. East, Spencer, Iowa 53101

[22] Filed: Feb. 14, 1975

[21] Appl. No.: 549,908

[52] U.S. Cl. .................................. 214/89; 104/89; 198/735; 198/812; 214/41 R; 214/83.36
[51] Int. Cl.² ........................................ B65G 47/36
[58] Field of Search ........... 198/100, 101, 139, 233; 104/92, 97, 162, 172 C, 89; 214/38 B, 38 BA, 38 C, 41, 89, 91 R, 83.36

[56] References Cited
UNITED STATES PATENTS

| | | | |
|---|---|---|---|
| 2,234,287 | 3/1941 | Sluyter | 104/92 |
| 2,760,617 | 8/1956 | Bowen | 198/139 X |
| 2,883,700 | 4/1959 | Liebmann, Jr. | 104/97 UX |
| 3,039,403 | 6/1962 | McDonough | 104/178 |
| 3,552,546 | 1/1971 | Rath | 198/233 |
| 3,557,939 | 1/1971 | Lyons | 198/139 |
| 3,596,785 | 8/1971 | Weatherford | 198/139 X |
| 3,625,376 | 12/1971 | McWilliams | 214/41 X |
| 3,819,068 | 6/1974 | Weir | 214/38 C |
| 3,827,585 | 8/1974 | McWilliams | 214/41 |
| 3,836,021 | 9/1974 | McWilliams | 214/41 |

FOREIGN PATENTS OR APPLICATIONS

| | | | |
|---|---|---|---|
| 2,108,247 | 9/1971 | Germany | 198/139 |

*Primary Examiner*—John J. Love
*Assistant Examiner*—Richard K. Thomson
*Attorney, Agent, or Firm*—Zarley, McKee, Thomte & Voorhees

[57] ABSTRACT

The present invention comprises an extensible boom assembly having an anchored end and a distal end. Conveyor means are mounted on the frame assembly for transporting items from the anchored end to the distal end. Takeup means are associated with the conveyor for taking up the slack in the conveyor whenever the frame assembly is retracted and for feeding out the slack in the conveyor whenever the frame assembly is extended. An unloading device is mounted adjacent the distal end of the frame assembly.

The method of the present invention comprises extending a longitudinally extensible conveyor from a loading dock into the trailer of a truck, moving a continuous flexible member mounted on the conveyor in a continuous path from the loading dock into the interior of the trailer, placing items to be loaded into the trailer into engagement with the moving member so that they are carried into the truck trailer, and retracting the longitudinally extensible conveyor to a retracted position where it is removed from the interior of the trailer.

15 Claims, 11 Drawing Figures

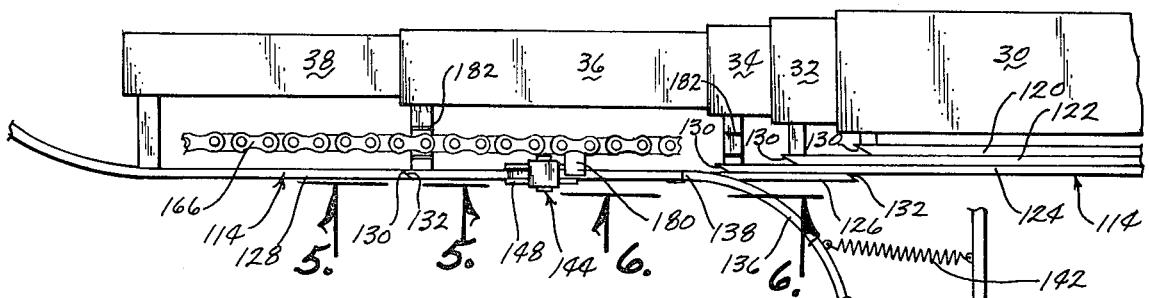
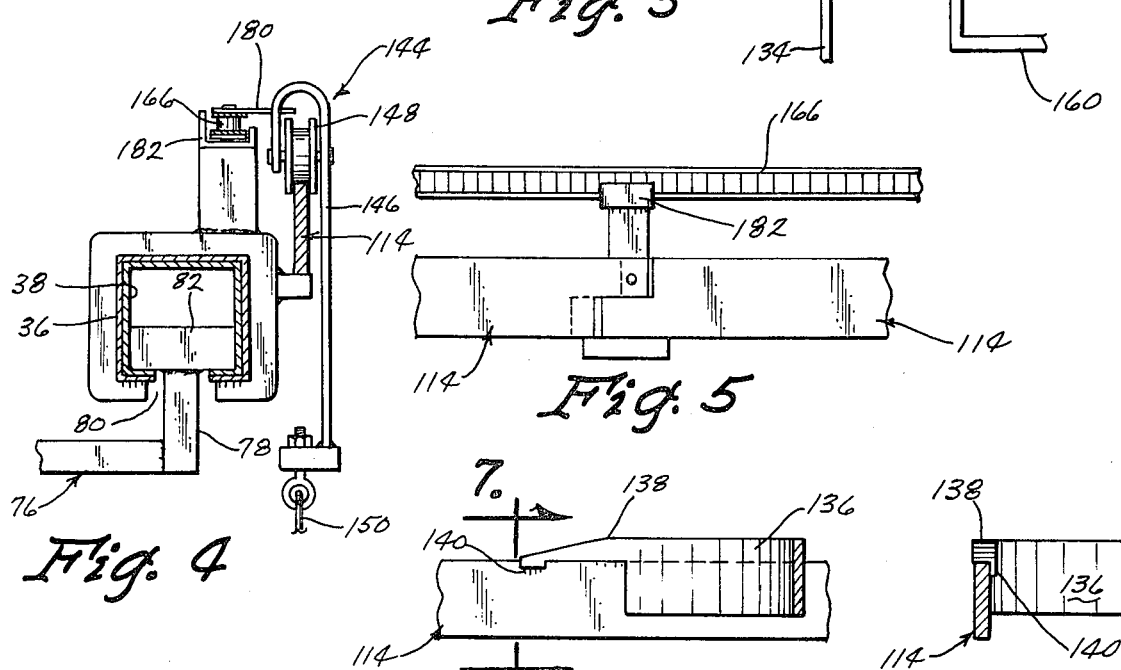
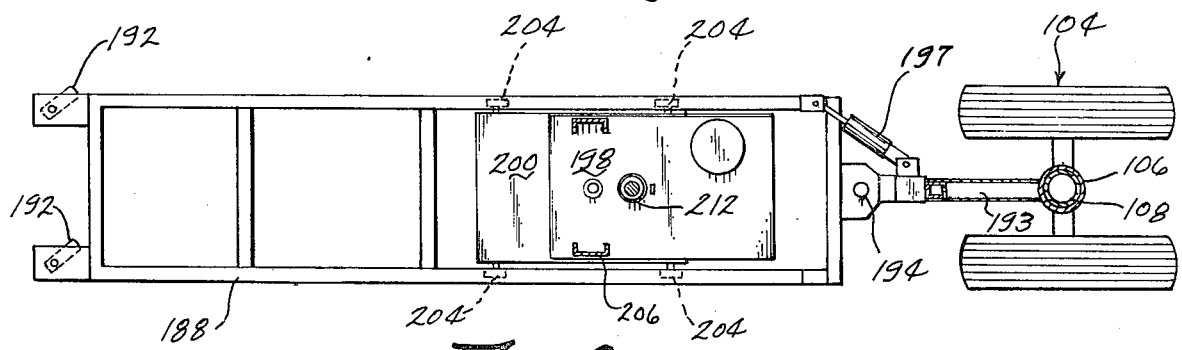

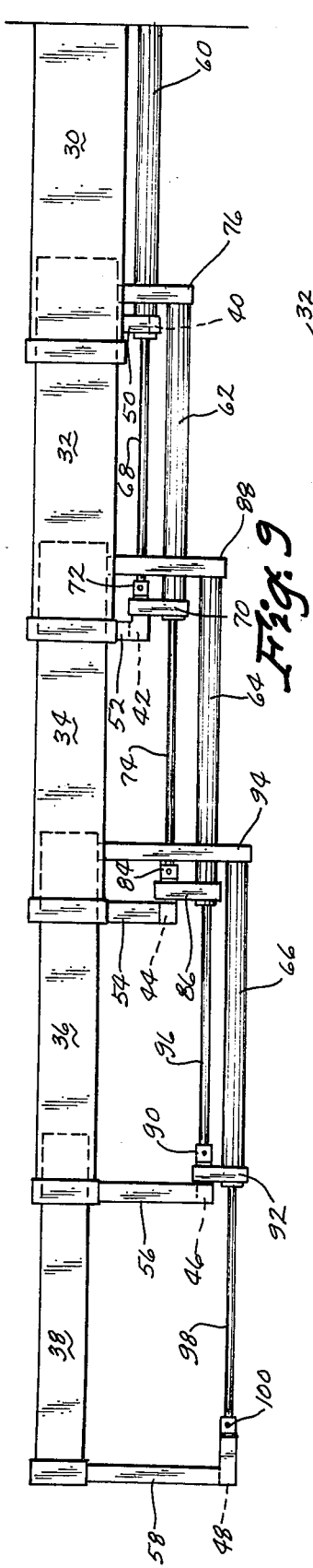

METHOD AND MEANS FOR CONVEYING ITEMS

SUMMARY OF THE INVENTION

This invention relates to beef conveyors for loading truck trailers at loading docks, but the invention could be utilized for any loading operation which requires extensible conveyors.

A problem commonly encountered in meat packing plants is the loading of beef carcasses from the warehouse into the truck trailers for distribution. The carcasses are heavy and must be transported to the front end of the trailer from the loading dock.

The present invention provides a practical extensible conveyor which can extend into the truck and which is capable of automatically carrying the beef carcasses to the portion of the truck trailer where they are to be stored. An important feature of the present invention is the takeup means for the conveyor chain of the device. As the device extends and retracts, there must be provided some means for taking up the slack in the conveyor chain. The present invention provides a practical takeup device for this purpose. Furthermore, the present invention utilizes a retractable track for carrying dollies which are propelled by the conveyor chain. An unloading device is also provided at the distal end of the conveyor for facilitating removal of the beef carcasses from the conveyor and for placing the carcasses on hanging rods within the truck trailer.

Therefore, a primary object of the present invention is the provision of an extensible conveying device which can be extended within a trailer and which may be retracted after the trailer is filled.

A further object of the present invention is the provision of an extensible conveyor loop chain having takeup means for taking up the slack of the chain whenever the device is extended or retracted.

A further object of the present invention is the provision of a continuous track for carrying dollies, the track being retractable in unison with the boom sections of the conveyor.

A further object of the present invention is the provision of an extensible conveyor which is automatically extensible and which includes a power conveyor.

A further object of the present invention is the provision of an extensible conveyor which is sturdy and will support heavy weight adjacent its distal end.

A further object of the present invention is the provision of a device wherein the items being carried thereon are automatically deposited at the distal end.

A further object of the present invention is the provision of a conveyor having an unloading device at the distal end thereof.

A further object of the present invention is the provision of an extensible conveyor having an unloading device at the distal end, the unloading device being further movable to position the items at the desired location.

A further object of the present invention is the provision of a device which is durable in use and which is economical to manufacture.

BRIEF DESCRIPTION OF THE VIEWS OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 3 is a top view showing the boom section and the rail sections in a partially retracted position.

FIG. 4 is a sectional view of one boom section.

FIG. 5 is a view taken along line 5—5 of FIG. 3.

FIG. 6 is a view taken along line 6—6 of FIG. 3.

FIG. 7 is a sectional view taken along line 7—7 of FIG. 6.

FIG. 8 is a view taken along line 8—8 of FIG. 2.

FIGS. 9, 10 and 11 are schematic views of the boom sections illustrating their various positions during extension and retraction of the boom sections.

DETAILED DESCRIPTION

Figures 1, 2:
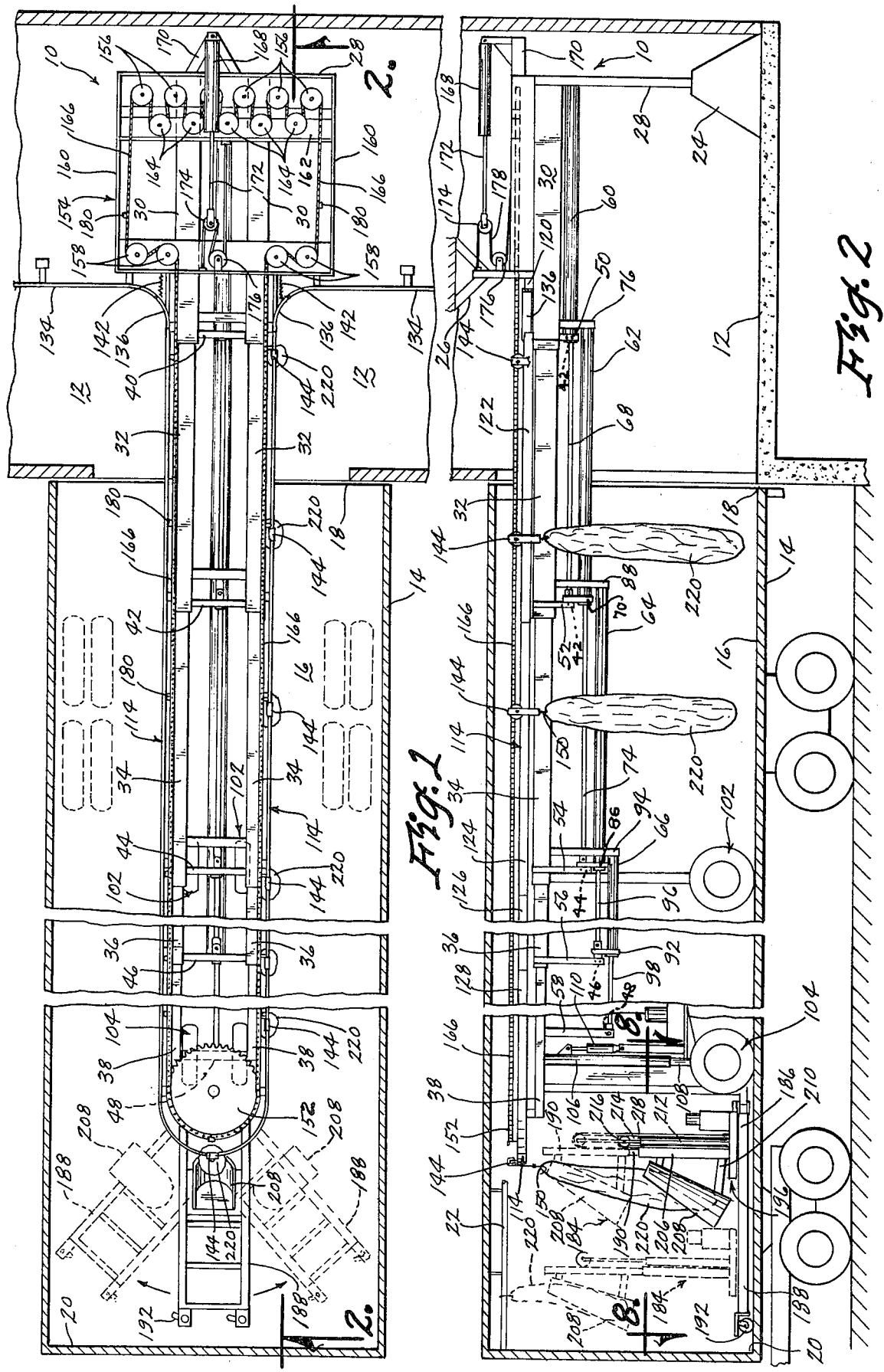
FIG. 1 is a top view of the device of the present invention.
FIG. 2 is a sectional view taken along line 2—2 of FIG. 1.

Referring to the drawings, the device of the present invention is generally designated by the numeral 10. It is shown mounted on a loading dock 12 against which a truck trailer 14 is positioned. Trailer 14 includes a floor 16, a rearward end 18, a forward end 20, and a plurality of rails 22 for hanging the beef carcasses. Associated with dock 12 are a pedestal frame 24 and an overhead frame 26. Pedestal frame 24 includes an upstanding member 28 for supporting the present device.

A pair of spaced apart first boom sections 30 are rigidly secured to upstanding member 28 and overhead frame 26 by welding, bolts or the like. Boom sections 30 each telescopically receive four additional boom sections 32, 34, 36 and 38 which are all telescoped with respect to one another for longitudinal extension and retraction. The rearward ends of boom sections 30 are rigidly mounted to upstanding member 28 and the forward ends of the pair of boom sections 30 are rigidly interconnected by means of a cross bar 40. Similar cross bars 42, 44, 46 and 48 interconnect pairs of boom sections 32, 34, 36 and 38, respectively. Each of the aforementioned cross bars is mounted to its respective pair of boom sections by means of downwardly extending legs 50, 52, 54, 56 and 58, respectively, as can be readily seen in FIGS. 2 and 9. Cross bars, 40, 42, 44, 46 and 48 extend between and are welded to the lower ends of legs 50, 52, 54, 56 and 58, respectively. Four hydraulic cylinders 60, 62, 64, and 66 are rigidly connected to boom sections 30, 32, 34 and 36, respectively. Cylinder 60 is connected at its rearward end to upstanding member 28 and is connected at its forward ends to cross bar 40. Cylinder 60 includes an extensible piston rod 68 which is connected at its forward end to cross bar 42 of boom section 32.

Hydraulic cylinder 62 is rigidly connected to second boom section 32 for movement in unison therewith. The forward end of cylinder 62 is rigidly connected to cross bar 42 by means of a collar 70 which embraces the forward end of cylinder 62 and a rearwardly extending protrusion 72 extending rearwardly from cross bar 42. Collar 70 is welded to protrusion 72 and cylinder 62. Cylinder 63 includes an extensible piston rod 74 which is rigidly connected to cross bar 44 of the third boom section 34. The rearward end of cylinder 62 is connected to a slide bar 76. The specific structure of slide bar 76 is shown in FIG. 4. Slide bar 76 includes an upwardly extending arm 78 which protrudes upwardly through an elongated slot 80 formed in the lower surface of boom section 30 and boom section 32. A foot 82 on the upper end of arm 78 is welded to the interior of boom section 32. Thus it can be seen that cylinder 62 is rigidly connected to boom section 32 for sliding movement in unison therewith. Slide bar 76 is free to slide with respect to boom section 30 by virtue of slot 80 therein.

Cylinder 64 is similarly connected to boom section 34 for movement in unison therewith. The forward end of cylinder 64 is connected to a protrusion 84 on cross bar 44 by means of a collar 86. The rearward end of cylinder 64 is connected to the rearward end of boom section 34 by means of a slide bar 88. Similarly cylinder 66 is connected to boom section 36 by means of a corresponding protrusion 90, collar 92, and slide bar 94. Cylinder 64 includes a piston rod 96 which is connected to protrusion 90 and cylinder 66 includes a piston rod 98 which is connected to a rearwardly extending protrusion 100 on cross bar 48.

FIGS. 9, 10, and 11 illustrate how the various boom sections extend and retract with respect to one another. FIG. 9 illustrates the device in its fully extended position. When retracting the device, cylinder 60 is actuated first to withdraw piston rod 68. This causes boom section 32 to slide inwardly within boom section 30. Cylinder 62 also moves in unison with boom section 32 to the position shown in FIG. 10. Because the remaining outer boom sections are rigidly connected by the various hydraulic cylinders, the outer portion of the boom section moves in unison with boom section 32. Slide bar 76 slides within slot 80 of boom section 30 to the position shown in FIG. 10. Next cylinder 62 is retracted so as to draw boom section 34 into boom section 32 to the position shown in FIG. 11. Cylinders 64 and 66 are then retracted successively to completely withdraw the boom sections into boom section 30.

Rigidly connected to cross bar 44 and extending downwardly therefrom is a wheel assembly 102 and a similar wheel assembly 104 is connected to cross bar 38. Wheel assemblies 102, 104 are identical in structure. The details of assembly 102 are not shown in the drawings for purposes of clarity, but the details of wheel assembly 104 are shown. Assembly 104 includes a vertical support member comprised of two telescoped members 106, 108. A hydraulic cylinder 110 is connected to a base portion which is fixed to member 108 and the other end of cylinder 110 is connected to telescope member 106. Thus extension and retraction of cylinder 110 causes extension and retraction of telescope members 108, 110. Thus cylinder 110 can be used to extend and retract the wheel assembly to accommodate differences in height of the boom assembly above the floor 16 of the trailer.

Mounted to the boom assembly and extending the length of the entire boom assembly is a rail 114. Rail 114 is comprised of a plurality of rail sections, 120, 122, 124, 126 and 128, each of which is rigidly connected at its forward end to boom sections 30, 32, 34, 36 and 38, respectively. The respective rail sections can be seen clearly in FIG. 3. Each rail section includes a beveled forward edge 130 and a beveled rearward edge 132 which are adapted to abut against one another and interlock as shown in FIG. 5 when the boom sections are in their fully extended position. However, as the boom sections are retracted, each successive rail section cams outwardly as illustrated in FIG. 3. The rearward ends of each rail section are biased slightly inwardly by virtue of their welded securement to the forward ends of each boom section. Thus as the boom sections are extended from the positions shown in FIG. 3, the various rearward ends of the rail sections snap inwardly so that surfaces 132, 130 abut against one another in the fully extended position. Thus when the boom sections are fully extended, the rails combine to form a continuous rail designated by the numeral 114. A permanent rail such as those found in conventional meat packing plants is designated by the numeral 134. An arcuate hinged rail gate 136 is hinged to rail 134 and includes a finger portion 138 (FIG. 6) having a clip 140 adapted to fit against rail 114 so as to provide a smooth continuation from permanent rail 134 to rail 114. Referring to FIG. 3, it should be noted that the rail sections cam outwardly at a point rearwardly of gate 136. Thus during extension of the boom sections, rail surfaces 130, 132 are in abutting engagement before they pass beneath clip 140 of gate 136. A spring 142 yieldably urges gate 136 into engagement with rail 114.

Rails 134, 114 are adapted to accommodate a plurality of dollies 144 (FIG. 4). Dollies 144 include an inverted J-shaped yoke 146 having a pulley 148 rotatably mounted at its upper end and having a meat hook 150 hanging from its lower end.

Mounted adjacent to the distal end of the boom assembly is a large conveyor sprocket 152. Sprocket 152 is mounted for rotation about a vertical axis. Mounted above the pair of boom sections 30 is a rectangular block frame 154. Block frame 154 includes a fixed row of sprockets 156 at its rearward end, each of the sprockets in row 156 being rotatably mounted about a vertical axis. Adjacent its forward end, block frame 154 includes four idler sprockets 158. A pair of side frame members 160 are on opposite sides of block frame 154. Slidably mounted in side frames 160 is a slide frame 162 which is free to slide between the fixed row of 156 of sprockets and idler sprockets 158. Slide frame 162 includes a plurality of sprockets 164 thereon.

A loop chain 166 is trained around the sprockets of slide bar 162 and the sprockets of fixed row 156 in block and tackle fashion. Chain 166 then progresses around idler sprockets 158 and continues outwardly where it is trained around large conveyor sprocket 152. This arrangement permits slide bar 162 to take up the slack in the loop chain by moving away from fixed row sprockets 156. Slide frame 162 is biased away from fixed row sprockets 156 by means of a pneumatic cylinder 168. Cylinder 168 is mounted at its rearward end to an upstanding bracket 170 which in turn is rigidly connected to upstanding member 128 and pedestal frame 24. Cylinder 168 includes a piston rod 172 which has a sheave 174 at its outer end. A fixed sleeve 176 is secured to overhead frame 126. Trained around sheave 174, 176 is a cable 178 which has one end fixed to overhead frame 26 and which passes around sheaves 174, 176 and then is anchored to slide frame 162. Cylinder 168 preferably is of the pneumatic type with a seven-inch diameter piston. Preferably a vacuum is applied within cylinder 168 and 125 pounds per square inch so as to provide the needed bias to slide bar 162.

The chain 166 includes a plurality of dogs 180 (FIG. 4) which extend outwardly sufficiently far to engage dolly 144 and carry dolly 144 along rail 114 in unison with chain 166. A plurality of J-shaped guides 182 (FIGS. 3 and 4) maintain chain 166 a constant distance from rail 114. It should be noted adjacent large sprocket 152, rail 114 moves a significantly farther distance away from chain 166 as can be readily seen in FIG. 1. This causes the dollies 144 to move out of engagement with dogs 180, thereby resulting in a congregation of the dollies 144 at the distal end of the conveyor assembly. The dollies may be manually moved around the distal end of rail 114 where they will again be caught by the dogs of chain 166 and carried back toward the loading dock by the conveyor chain.

When the boom sections are in their retracted positions pneumatic cylinder 168 causes slide bar 162 to be moved to its extreme forward position, thereby taking up the slack in chain 166. As the boom sections are extended, slide rail 162 is pulled forwardly against the bias provided by pneumatic cylinder 168, thereby feeding out the required amount of chain to compensate for the increased length of the boom section. Similarly, when the boom sections are retracted, slide rail 162 is returned to its forward position so as to take up the slack when the boom assembly becomes shorter.

Mounted adjacent the distal end of the boom assembly is an unloading device generally designated by the numeral 184. This unloading device includes an L-shaped motor frame 186 having a horizontal frame portion 188 and a vertical frame portion 190. Horizontal frame portion 188 includes a pair of casters 192 at its forward end, and is pivotally mounted to a tongue 193 extending forwardly from the forward wheel assembly 104. The pivotal mounting to tongue 193 is about a vertical axis 194, and a hydraulic cylinder 197 is provided for causing selective swinging movement of horizontal frame 188 about vertical axis 194.

Vertical frame portion 190 includes a pedestal portion 196 having upper and lower pedestal halves 198, 200 which are swiveled with respect to one another for pivotal movement about a vertical axis. Lower pedestal half 200 includes roller bearings 204 (FIG. 8) which are guided within the lateral side portions of horizontal frame 188 so as to permit pedestal 196 to move longitudinally along the length of horizontal frame 188. Extending upwardly from upper pedestal half 198 and rigidly secured thereto is an upstanding frame member 206. A basket 208 having brackets 210 thereon is slidably mounted with respect to upstanding frame member 206 for vertical sliding movements thereon. A hydraulic cylinder 212 is rigidly mounted with respect to upstanding frame member 206 and includes a piston rod 214 having a sheave 216 on its upper end. A cable 218 is anchored at the base of upper pedestal half 198 and extends upwardly over sheave 216 and downwardly again where it is anchored to bracket 210 of basket 208. Thus extension of hydraulic cylinder 212 causes basket 208 to be lifted vertically upwardly for vertical sliding movement along upstanding frame member 206.

Whenever a dolly 144 is deposited at the distal end of the boom assembly, the operator lifts basket 208 by actuating hydraulic cylinder 212. As basket 208 is lifted, it is guided so that it will receive a beef carcass 220 therein. The guiding may be accomplished by pivoting upper pedestal half 198 about its vertical pivotal connection with lower pedestal half 200. Once the beef carcass 220 is supported by basket 208, it is removed from dolly 144 and dolly 144 is pushed on around the distal end of the boom assembly so that it will be returned by chain 160 toward the loading dock. Basket 208 is then manually rolled outwardly toward the distal end of horizontal frame 188 by virtue of roller bearings 204 in lower pedestal half 198. Hydraulic cylinder 196 may be used to direct lower frame 188 to the desired position within the truck trailer. The beef carcass is then hooked over rail 22 within trailer 14 and basket 208 is again returned to receive another beef carcass.

The present invention thus provides an extensible conveyor which may be extended into the truck trailer and which provides an extensible track for dollies to be carried into the interior of the trailer from a loading dock. The device is automatically extensible and includes a power conveyor even though the device is extensible. The items carried automatically and deposited at the distal end of the conveyor. Furthermore, the device is structurally sound and will support heavy weight adjacent its distal end. The takeup mechanism permits the extensible device to be extended to any length for any size truck trailer without interfering with the continuous conveyor operation. The unloading device at the distal end is further movable to the exact position within the truck trailer where it is desired to place the object being carried. Thus it can be seen that the device accomplishes at least all of its stated objectives.

What is claimed:

1. An extensible conveyor comprising:
    a support;
    an extensible frame assembly having a first end mounted to said support and a distal end, said frame assembly comprising at least two elongated frame members movably mounted with respect to one another for extensible movement from a retracted to an extended position;
    a continuous flexible conveyor loop member,
    a loop mounting means on said frame assembly, said loop member being trained around said loop mounted means for movement about a continuous path commencing adjacent said first end of said frame assembly, thence adjacent said distal end, and thence returning to its original position adjacent said first end;
    said loop mounting means having takeup means for taking up the slack in said loop member when said frame members are in said retracted position and for feeding out the slack in said loop member when said frame members are in their extended positions; and
    power means for extending and retracting said frame assembly;
    an elongated rail assembly mounted on said frame assembly, said rail assembly having at least two rail members movably mounted with respect to one another and mounted to one of said frame members for movement in unison therewith whereby said rail assembly extends and retracts in unison with said frame assembly;
    at least one dolly movably mounted on said rail assembly for movement therealong, said rail assembly being shaped to follow a path adjacent the path of said loop member; and
    dog means on said loop member for engaging said dolly and moving said dolly along said rail whenever said loop member moves along its path.

2. An extensible conveyor according to claim 1 wherein said takeup means comprises two block frames, each having a plurality of rotatable members thereon, said loop member being trained around said rotatable members of both of said block frames, at least one of said block frames being movable toward and away from the other whereby movement of said block frames towards one another feeds out slack in said loop member and movement of said block frames away from one another takes up slack.

3. An extensible conveyor according to claim 2 wherein said takeup means includes bias means for yieldably urging said block members toward one another.

4. An extensible conveyor according to claim 3 wherein said bias means comprises a pneumatic piston and cylinder.

5. An extensible conveyor according to claim 1 wherein said frame is spaced away from said loop member at said distal end of said frame assembly a sufficient distance that said dolly moves out of engagement with said dog means when said dolly approaches said distal end of said frame means.

6. An extensible conveyor according to claim 1 wherein at least one upstanding leg assembly is attached to said frame assembly at a point spaced from said anchored end thereof, said leg assembly having wheel means rotatably mounted on the lower end thereof.

7. An extensible conveyor according to claim 6 wherein said upstanding leg assembly includes two leg members vertically extensibly movable with respect to one another, power means being connected to said leg members for extending and retracting said leg members with respect to one another.

8. An extensible conveyor according to claim 1 wherein unloading means is mounted to said frame assembly adjacent said distal end thereof, said unloading means comprising a container, a vertical unloading frame member, means movably mounting said container to said vertical unloading frame member for vertical movement, and unloading power means for moving said container vertically.

9. An extensible conveyor according to claim 8 comprising a horizontal unloading frame member, means movably mounting said vertical frame member to said horizontal frame member or horizontal movement.

10. An extensible conveyor according to claim 9 wherein said vertical member comprises a platform and an upstanding portion, said upstanding portion being pivotally mounted to said platform for pivotal movement about a vertical axis.

11. An extensible conveyor according to claim 9 wherein said horizontal frame isi pivotally mounted to said frame assembly for movement about a vertical axis, power means interconnecting said frame assembly and said horizontal unloading frame member for causing swinging movement of said horizontal frame member about said vertical axis.

12. An extensible conveyor comprising:
a support;
an extensible frame assembly having a first end mounted to said support and a distal end, said frame assembly comprising at least two elongated frame members movably mounted with respect to one another for extensible movement from a retracted to an extended position;
a continuous flexible conveyor loop member,
loop mounting means on said frame assembly, said loop member being trained around said loop mounting means for movment about a continuous path commencing adjacent said first end of said frame assembly, thence adjacent said distal end, and thence returning to its original position adjacent said first end;
said loop mounting means having takeup means for taking up the slack in said loop member when said frame members are in said retracted position and for feeding out the slack in said loop member when said frame members are in their extended positions; and
power means for extending and retracting said frame assembly;
unloading means mounted adjacent said distal end of said frame assembly, said unloading means comprising an unloading frame, a container, means movably mounting said container to said unloading frame for vertical movement thereon, and power means for causing vertical movement of said container on said unloading frame;
said unloading frame comprising a vertical unloading frame and a horizontal unloading frame, said vertical frame having a pedestal portion movably mounted to said horizontal frame for horizontal movement of said vertical frame with respect to said horizontal frame.

13. An extensible conveyor according to claim 12 wherein said horizontal frame is pivotally mounted to said frame assembly for pivotal movement about a vertical axis, power means connected to said horizontal frame for causing pivotal movement of said horizontal frame about said vertical axis.

14. An extensible conveyor according to claim 12 wherein said vertical frame comprises an upstanding portion pivotally mounted to said pedestal portion for pivotal movement about a vertical axis.

15. An extensible conveyor comprising a support;
an extensible frame assembly having a first end mounted to said support and a distal end, said frame assembly comprising at least two elongated frame members telescopically mounted with respect to one another for extensible movement from a retracted to an extended position;
a rail assembly comprising a plurality of rail members, each of said rail members being attached to one of said frame members, said rail assembly being extensible in unison with said frame assembly from a retracted position wherein said rail members are in side by side relationship to an extended position wherein said rails are in end to end relationship to form a continuous rail;
loop mounting means on said frame assembly, said loop member being trained around said loop mounting means for movement about a continuous path commencing adjacent said first end of said frame assembly, thence adjacent said distal end, and thence returning to its original position adjacent said first end;
said loop mounting means having takeup means for taking up the slack in said loop member when said frame members are in said retracted position and for feeding out the slack in said loop member when said frame members are in their extended positions; and
power means for extending and retracting said frame assembly.

* * * * *